(12) United States Patent
Joshi

(10) Patent No.: US 8,046,347 B2
(45) Date of Patent: *Oct. 25, 2011

(54) METHOD AND APPARATUS FOR RECONSTRUCTING A SEARCH QUERY

(75) Inventor: Deepa Joshi, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/765,676

(22) Filed: Apr. 22, 2010

(65) Prior Publication Data

US 2010/0287149 A1    Nov. 11, 2010

Related U.S. Application Data

(63) Continuation of application No. 11/502,202, filed on Aug. 10, 2006, now Pat. No. 7,716,201.

(51) Int. Cl.
*G06F 17/30* (2006.01)

(52) U.S. Cl. ......... 707/706; 707/707; 707/715; 707/758

(58) Field of Classification Search .................. 707/706, 707/715, 748, 754
See application file for complete search history.

(56) References Cited

U.S. PATENT DOCUMENTS

| | | | |
|---|---|---|---|
| 5,765,147 A | 6/1998 | Mattos et al. ................. 707/4 |
| 6,112,172 A | 8/2000 | True et al. ..................... 704/235 |
| 6,134,540 A | 10/2000 | Carey et al. ................... 707/2 |
| 6,269,361 B1 | 7/2001 | Davis et al. ................... 707/3 |
| 6,876,997 B1 | 4/2005 | Rorex et al. ................... 707/3 |
| 7,149,732 B2 | 12/2006 | Wen ............................... 707/6 |
| 7,181,446 B2 | 2/2007 | Bossman et al. ............... 707/3 |
| 7,188,098 B2 | 3/2007 | Chen et al. .................... 707/2 |
| 7,330,848 B2 | 2/2008 | Chaudhuri et al. ............ 707/3 |
| 7,337,163 B1 | 2/2008 | Srinivasan et al. ............ 707/3 |
| 2002/0123994 A1* | 9/2002 | Schabes et al. ............... 707/5 |
| 2003/0084027 A1 | 5/2003 | Brandin et al. ............... 707/3 |
| 2004/0254928 A1 | 12/2004 | Vronay et al. ................ 707/5 |
| 2005/0222975 A1 | 10/2005 | Nayak et al. ................. 707/3 |
| 2005/0283468 A1* | 12/2005 | Kamvar et al. ............... 707/3 |
| 2006/0106769 A1 | 5/2006 | Gibbs ........................... 707/3 |
| 2006/0206454 A1 | 9/2006 | Forstall et al. ................ 707/3 |
| 2006/0282404 A1* | 12/2006 | Chaudhuri et al. ............ 707/2 |
| 2007/0050351 A1 | 3/2007 | Kasperski et al. ............ 707/4 |
| 2007/0061317 A1 | 3/2007 | Ramer et al. ................. 707/4 |
| 2008/0040323 A1 | 2/2008 | Joshi ............................. 707/3 |
| 2008/0114743 A1 | 5/2008 | Venkataraman et al. ...... 707/3 |

FOREIGN PATENT DOCUMENTS

WO    WO 97/38376 A2    10/1997

OTHER PUBLICATIONS

H. Itoh, NTCIR-4 Patent Retrieval Experiments at RICOH, Working Notes of NTCIR-4, NII Test Collection for IR Systems Workshop 4, Jun. 2-4, 2004, 4 pages.

* cited by examiner

*Primary Examiner* — Hanh Thai

(74) *Attorney, Agent, or Firm* — Brinks Hofer Gilson & Lione

(57) ABSTRACT

Methods and systems for reconstructing a full query based on a partial query are disclosed. Existing interfaces for search engines may be rigid and require users to submit full queries to perform searched. The methods and systems described herein may solve these problems by allowing a flexible way for users to submit a partial query and reconstruct a full query based on the partial query. A search may then be performed using the reconstructed query.

14 Claims, 7 Drawing Sheets

| Query | Weight |
|-------|--------|
| Weather | 100.8 |
| Maps | 200.4 |
| Game | 50.9 |
| ... | ... |

Figure 5

METHOD AND APPARATUS FOR RECONSTRUCTING A SEARCH QUERY

RELATED APPLICATIONS

The present patent document is a continuation of patent application Ser. No. 11/502,202, filed Aug. 10, 2006, pending, which is hereby incorporated by reference.

BACKGROUND

1. Technical Field

This application relates to search engines. In particular, this application relates to a flexible and intuitive system for reconstructing a search query based on a received partial query.

2. Related Art

The transfer of information over computer networks, such as the Internet, has become an increasingly important means by which institutions, corporations, and individuals do business. Computer networks have grown over the years from independent and isolated entities established to serve the needs of a single group into vast internets which interconnect disparate physical networks and allow them to function as a coordinated system. Currently, the largest computer network in existence is the Internet. The Internet is a worldwide interconnection of computer networks that communicate using a common protocol. Millions of computers, from low end personal computers to high end supercomputers, are connected to the Internet.

The availability of powerful new tools that facilitate the development and distribution of Internet content (this includes information of any kind, in any form or format) has led to a proliferation of information, products, and services offered through the Internet and a dramatic growth in both the number and types of consumers using the Internet. To sift through this sea of information, user's typically employ the use of search engines that allow users to submit queries and provide responsive information, such as a list of references, that meet criteria specified in the query.

Additionally, the number of devices capable of accessing the Internet has also dramatically increased. Today, user's may access the Internet using a wide variety of devices, such as personal computers, cell phones, personal digital assistants, and the like which may utilize different networking technologies to connect to the Internet. The portability of the device and/or connection type has become an increasingly important concern for users. However, increased access costs and decreased input capabilities are often associated with portable Internet access. As a result, users are limited in their ability to access the full depth of the Internet. For example, users may not be able to take full advantage of a search engine on a mobile device, such as a cell phone, because the user is unable to enter a search query without substantial effort.

BRIEF SUMMARY

In one embodiment, a method for providing search results to a user is provided. The method may include receiving a first set of information indicative of a partial query, determining a full query based on the partial query, submitting the full query to a search engine, receiving results from the search engine, and presenting the results to the user.

In another embodiment, a method for determining a full query based on a partial query is provided. The method may include receiving a first set of information indicative of a partial query, comparing the partial query to an index of known search queries to determine matching known queries, determining a full query by selecting at least one of the matching known queries.

In another embodiment, a system for providing search results to a user is provided. The system may include a query reconstruction server operable to receive a first set of information indicative of a partial query, determining a full query based on the partial query, and submitting the full query to a search engine. The system may also include a web server operable to receiving results from the search engine and presenting the results to the user.

These and other embodiments and aspects are described with reference to the noted Figures and the below detailed description of the preferred embodiments.

BRIEF DESCRIPTION OF THE DRAWINGS

FIG. 5 is an exemplary query index;

DETAILED DESCRIPTION OF THE PRESENTLY PREFERRED EMBODIMENTS

Figure 1:
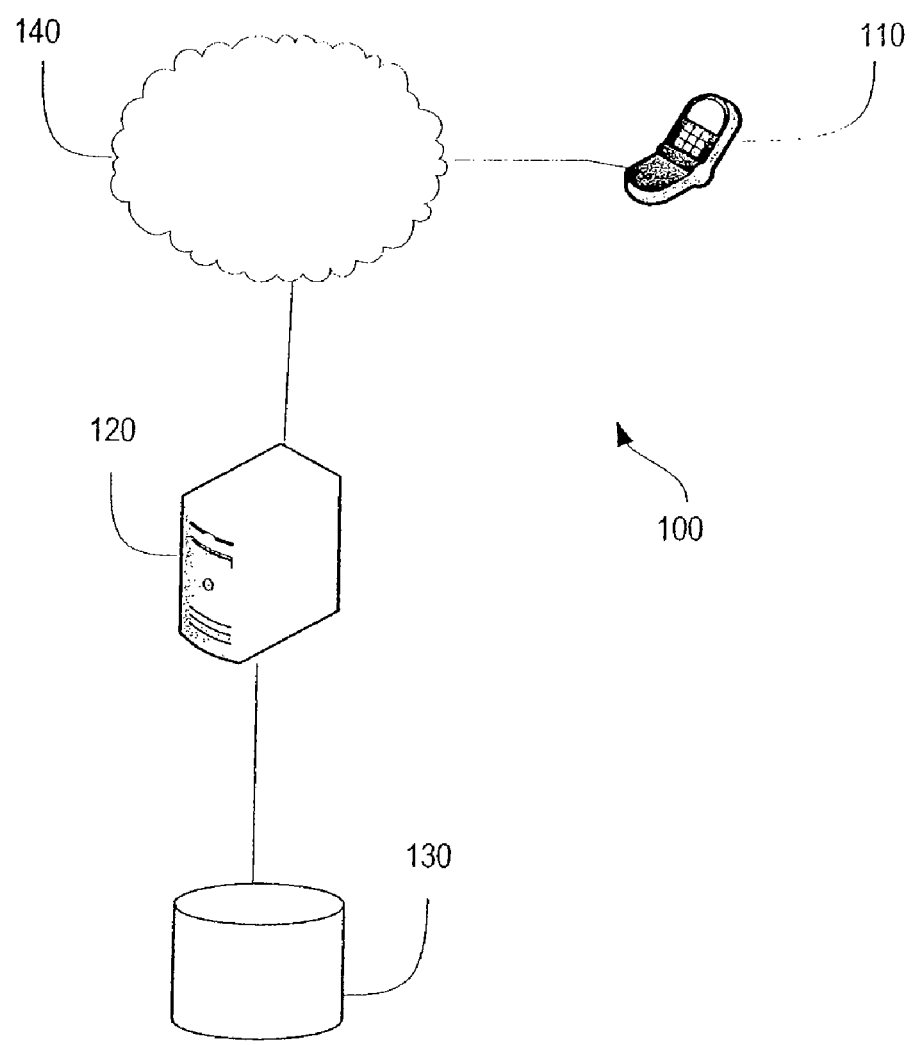
FIG. 1 is a diagram of an exemplary architecture for providing search results.

Referring now to the drawings, and initially to FIG. 1, an exemplary architecture for providing search results is shown. The architecture 100 may include a user client system 110, a search engine server 120, and a database 130. Although reference will now be made to specific components of the system performing specific features, it should be apparent that such reference is exemplary, is not intended to limit the scope of the claims in any way, and that the functionalities described herein may be implemented in a virtually unlimited number of configurations.

The user client system 110 may submit a search query to search engine 120 via the communications network 140. The communication network 140 may be any private or public communication network. The user client system 110 may connect to the search engine server 120 via the Internet using a standard browser application. A browser based implementation allows system features to be accessible regardless of the underlying platform of the user client system 110. For example, the user client system 110 may be a workstation computer, laptop computer, handheld computer, cell phone, mobile messaging device, or the like which may all utilize different hardware and/or software packages. Alternatively, or additionally, the user client system 110 may connect to the search engine server 120 using a stand-alone application which may be either platform dependent or platform independent. Other methods may be used to implement the user client system 110.

The search engine server 120 may receive a partial query from the user client system 110, reconstruct a full query and provide search results based on the reconstructed query. The search engine server 120 may also include a web server that delivers Web pages that may include the search results to browsers (and other files to applications) via the HTTP protocol. The search engine server 120 may include a database 130 for storing the information to be searched. The database 130 may also include search query statistics such as an index of all submitted queries, the number of times a particular query was submitted, and the like. Moreover, although figuratively attached to search engine server 120, database 130 may, in practice, distribute user-specific data elements (such as user preferences) to the user client system 110.

Figure 2:
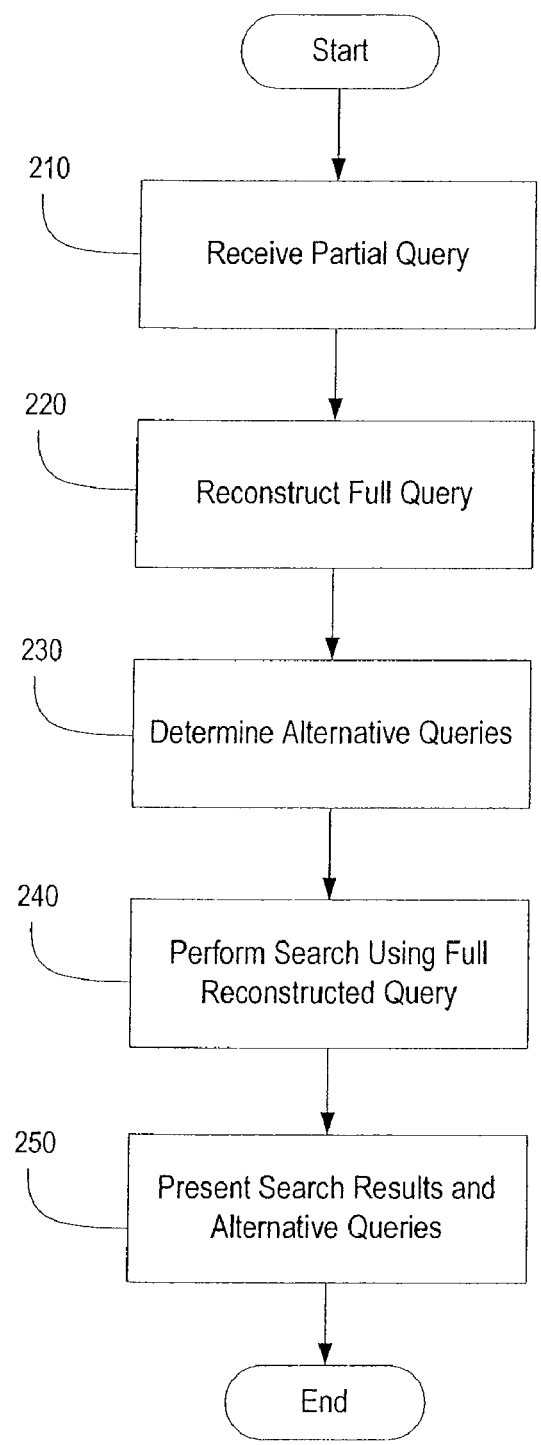
FIG. 2 is a flow chart of an exemplary method for providing search results to a user based on a partial query.

FIG. 2 is a flow chart of an exemplary method for providing search results to a user based on a partial query. Initially, the user may submit a partial query which is received at 210. As used herein, the term "partial search query" or "partial query" means any abbreviated or incomplete search query such that the submitted query is not fully representative of the entire search query desired by the user. In other words, partial search queries are shorthand ways of expressing typical search queries. For example, a partial query "a i" may be used to represent the full search queries "American Idol™" or "auto insurance." It should be apparent that a full search query may be represented by a multitude of partial search queries. As an additional example, the full query "auto insurance" may be represented by the partial queries "a ins," "auto ins," "a insurance" and the like. The partial search query may include a regular expression, such as the partial query "w c s[oc].*", which may match the full queries "world cup soccer", "world cup schedule", "world cup scores", and the like.

Next, a full query is reconstructed from the partial query at 220. For example, the query "auto insurance" may be reconstructed from a partial query of "a i". In order to reconstruct the full query, the partial query may be interpreted in a particular manner. The system may interpret the partial query as a series of word separated by delimiters, such as a space character. For example, the partial query "a i" may be interpreted as a two word query. Each word of the partial query may be interpreted as a partial word of the full query, and the system may then determine a full query that matches the partial words specified in the partial query. The determined full query may be the most frequently submitted known query that matches the partial words of the partial query in the same order, or may be determined using any other criteria.

Optionally, alternative queries may also be determined at 230. Alternative queries may include any query that matches the partial query but is not selected as the reconstructed full query. For example, the partial query "b" may be reconstructed as the query "basketball" while the query "baseball" may be determined to be an alternative query. The alternative queries may include any full queries that match the partial words of the partial query in a different order. The received partial query may also be designated as an alternative query.

Finally, a search may be performed using the reconstructed query at 240, and the results may be provided to the user at 250. Optionally, the alternative queries may also be provided to the user. For example, a list of hyperlinks may be provided that allow the user to submit a search using the alternative query. The list may also include the initially received partial query to allow the user to perform a search using the original partial query. The system may limit the number of alternative queries that are provided to the user, such as providing four or five alternative queries.

Figure 3:
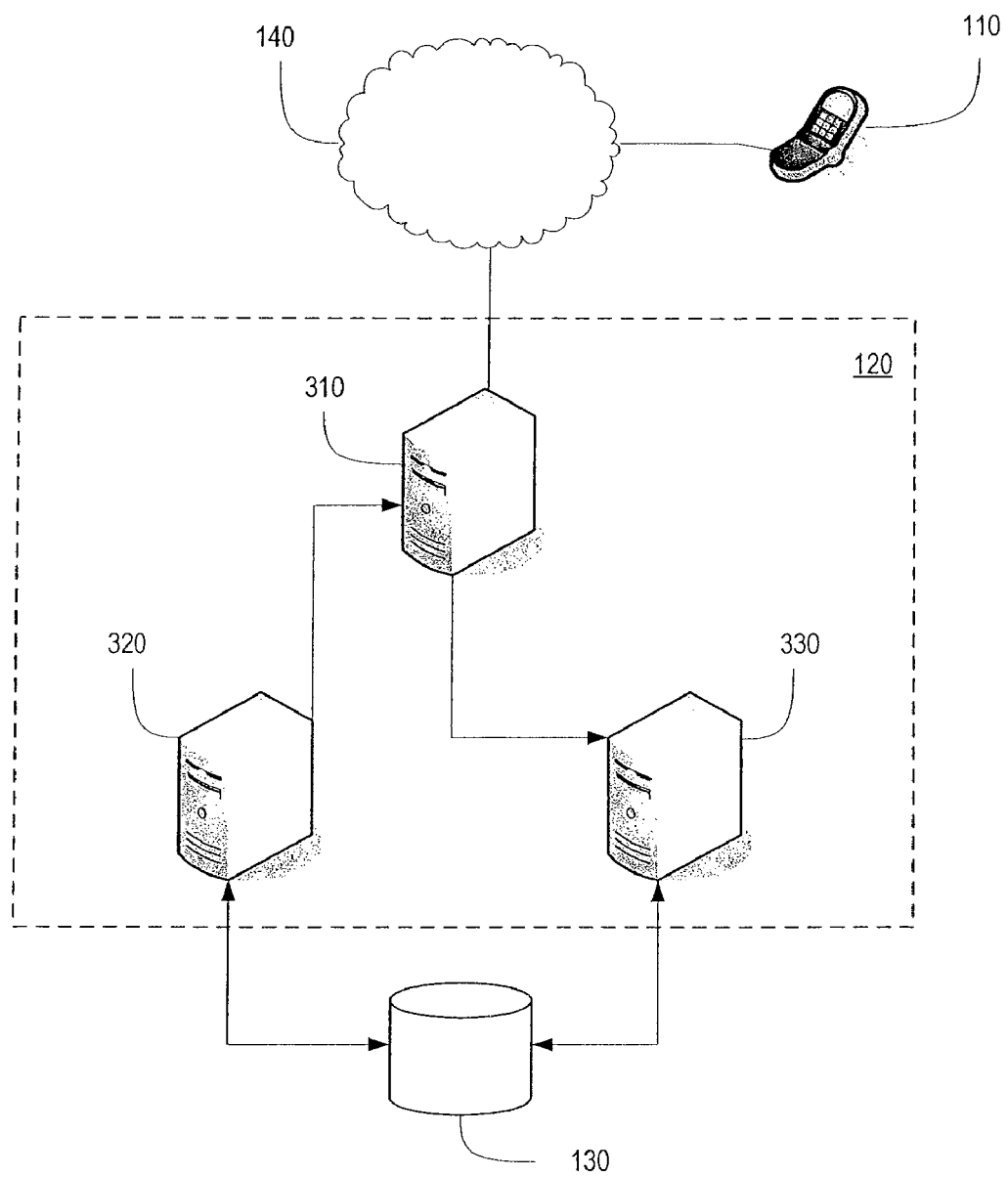
FIG. 3 is another exemplary architecture including a search engine and query reconstruction server.

Another exemplary architecture for providing search results is shown in FIG. 3. The architecture 300 may include a user client system 110, a search engine server 120, and a database 130, similar to those described above in reference to FIG. 1. The search engine server 120 may include a query reconstruction server 310, a query data management server 320, and a search engine 330. The query reconstruction server 310 may reconstruct a full query from a partial query submitted via the client system 110. The reconstructed query may then be provided to the search engine 330. The query reconstruction server 310 may also determine alternative queries and cause the alternative queries to be provided to the user client system 110.

Query data management server 320 may analyze historic query data. For example, the query data management server 320 may retrieve historic query data, analyze or filter the data, and generate data structures for later use in reconstructing the query. In one implementation, the query management may create query indexes that are provided to the query reconstruction server 310 for use in reconstructing the query. Other data structures may also be used.

Figure 4:
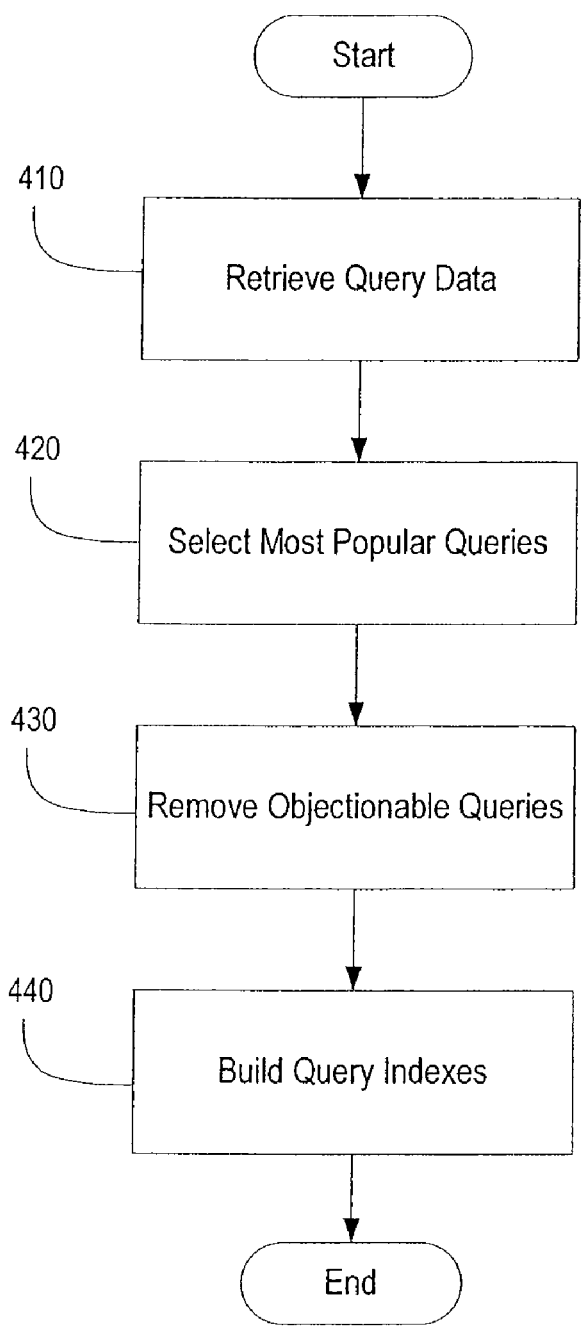
FIG. 4 is a flow chart of an exemplary method for building query indexes.

A flow chart of an exemplary method for building query indexes is shown in FIG. 4. Initially, query data may be retrieved from a database of query data. The query data may include previously submitted queries. For example, query data representative of previously submitted queries to the Yahoo! Search Engine may be retrieved. The query data may also include frequency counts representative of the number of times the query has been submitted. Alternatively, or additionally, the query data may include weights that are calculated using the frequency data. For example, a weight for a particular query may be calculated by multiplying a constant value by the negative logarithm of the ratio of the frequency for the particular query to the highest frequency for all queries. Other methods of calculating a weight may also be used. The search query data may be retrieved periodically, such as once a day, once a week, or the like. Optionally, query data from multiple sources may be retrieved and consolidated by the system.

Next, the retrieved query data may be filtered. First, the most popular queries from the retrieved queries may be selected at 420. For example, the top million queries may be selected. Other amounts and criteria may also be used to filter the query data. The system may also filter the query data for controversial or objectionable queries at 430. For example, queries containing sexually explicit terms may be removed. Misspelled queries may also be removed. Alternatively, misspelled queries may be corrected. The system may also remove queries that are determined to be improper for other reasons, such as non-human submitted queries and the like. Other criteria for filtering the query data may also be used.

Figure 5:
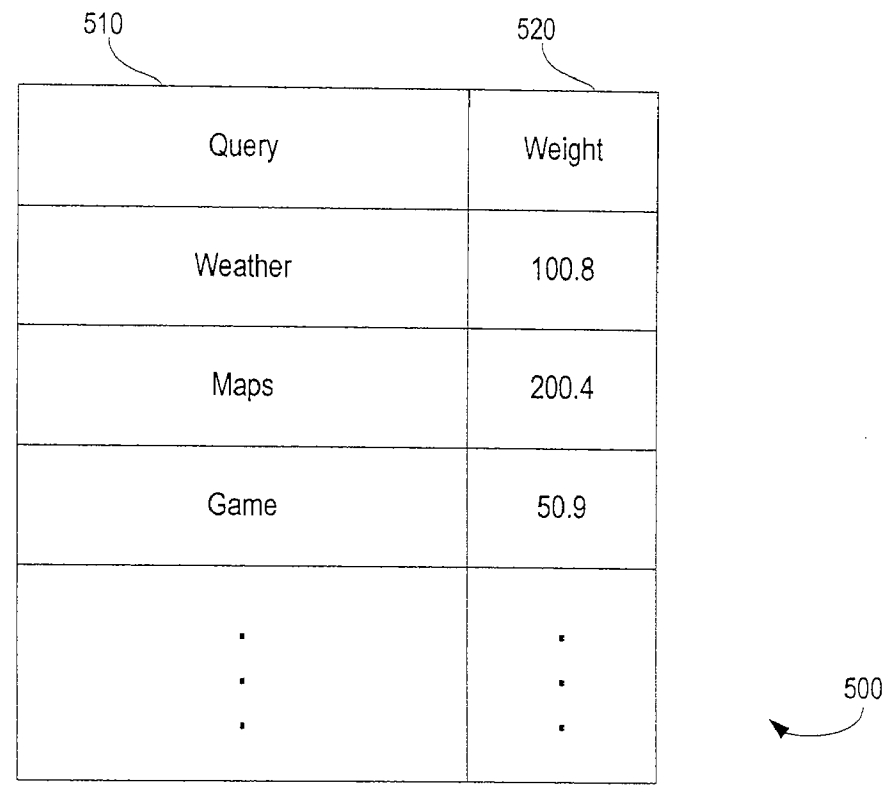
Figure 6:
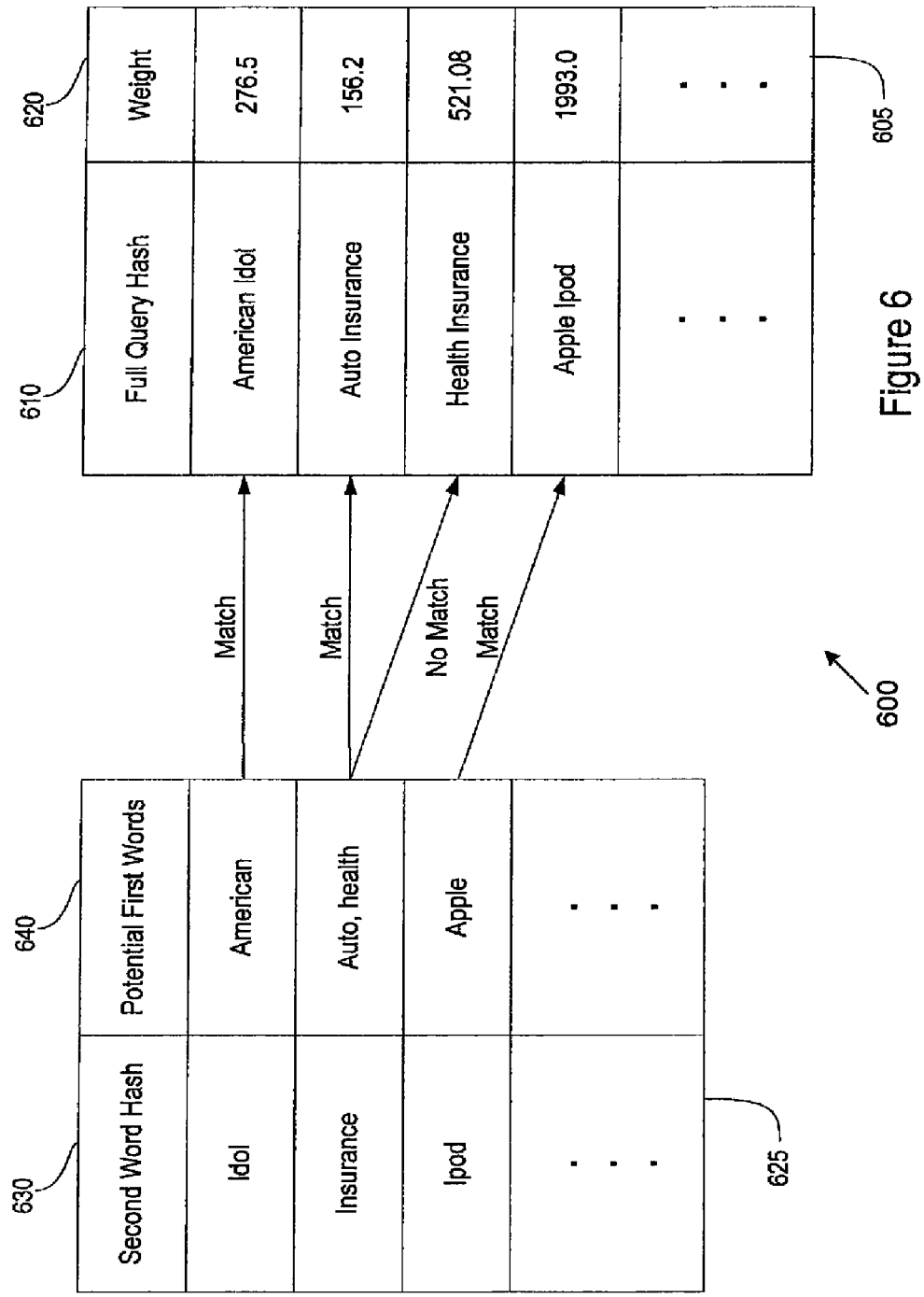
FIG. 6 is another exemplary query index.
Figure 7:
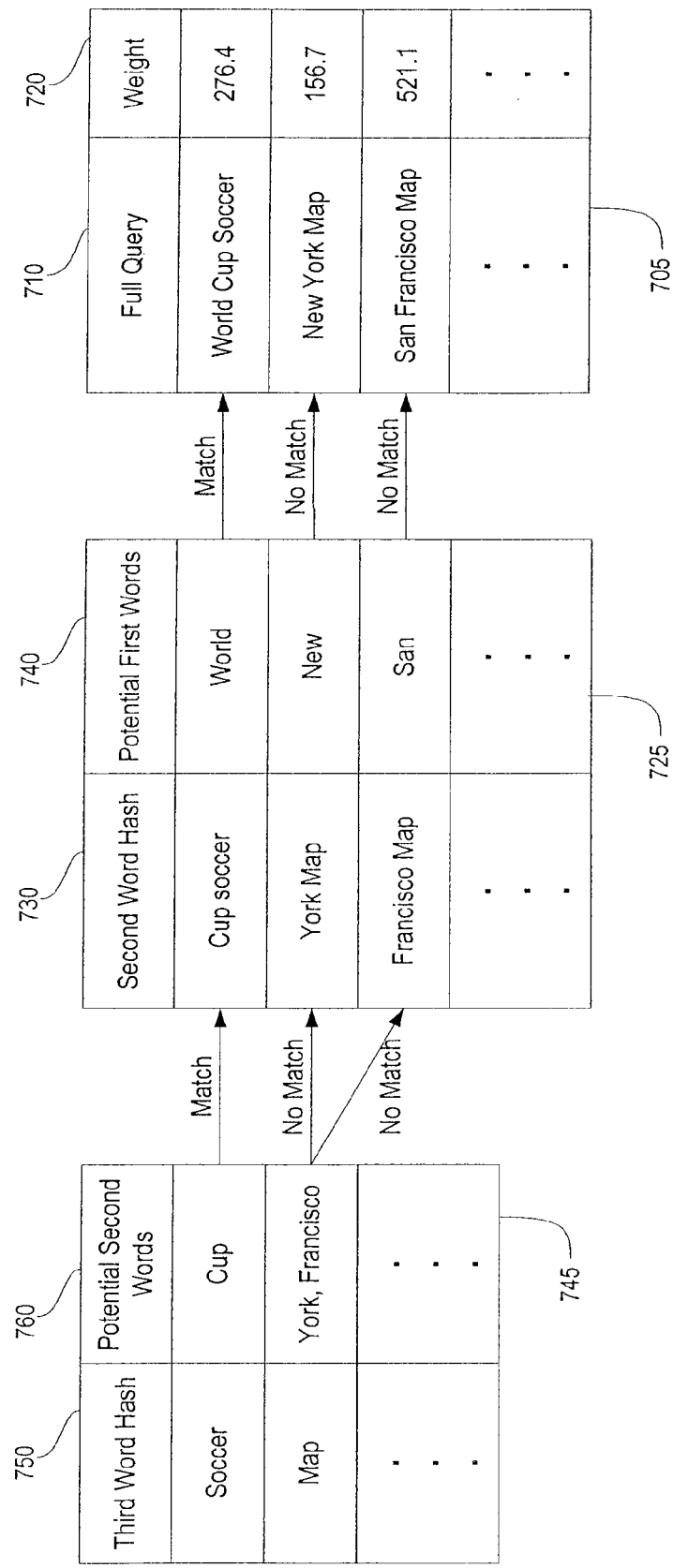
FIG. 7 is another exemplary query index.

Finally, the system may construct indexes from the filtered query data at 440. In one implementation, the filtered queries may be split into different groups based on number of words in the query. Indexes may then be created for each query group. Exemplary one-word, two-word, and three-word indexes are shown in FIGS. 5, 6, and 7, respectively, described in more detail below. The index files may then be transmitted to the query reconstruction server 310, which may utilize the indexes to reconstruct the partial queries.

An exemplary one-word index 500 is shown in FIG. 5. The index may include a query 510 and a frequency 520 for each filtered query. The query may act as a key for the index and may be represented by a hash value based on the actual query. For example, the index may include hash values and weights for the single word queries "weather," "maps," and "game." Assuming the system receives a partial query of "w," the system may determine which single word queries match the reconstruction pattern for "w," and select "weather" as the only potential match. The reconstructed query "weather" may then be submitted to a search engine. If additional matches are found, however, the system may then select the matching query with the largest weight as the reconstructed query. Optionally, the system may designate certain remaining matching queries as alternative queries, and provide a list of those alternative queries to the user with the search results.

An exemplary two-word index 600 is shown in FIG. 6. Two-word indexes may include a set of two sub-indexes. The first sub-index, referred to herein as the second word sub-index 625, may include a second word hash value 630 representative of all words that appear as the second word in the two word filtered query. The second word hash value 630 may act as a key for the second word sub-index, may also include corresponding values 640 representative of each potential first word that precedes the second word in the filtered two-word query. For example, the query "American Idol" may be represented as in the second word hash as the key-value pair "idol=American," while the queries "auto insurance" and "health insurance" may be represented in the second word sub-index 625 as the key-value pair of "insurance=auto, health."

Another sub-index, referred to herein as the first-word sub-index 605, may include hash values representative of the full two-word queries 610 along with their weight 620, similar to the one-word index described above. For example, the system may receive a partial query "a i" and determine potential matches from the second word sub-index of "idol," "insurance," and "ipod" by retrieving each value corresponding to the matching key. Each potential two-word query based on the partial matches may then be used to search the full query-hash 605. For example, the system may determine potential matches of "American Idol™," "auto insurance," "health insurance," and "Apple iPod™," based on the second word sub-index, and also determine that "health insurance" does not match based on the first word of the partial query "a i." The system may also determine a full query match by determining if the first word of the full query matches the first partial word of the partial query. The system may then retrieve weights 620 for each matching full query 610 from the first word sub-index 605.

The system may then select the most popular query from among the matching queries as the reconstructed query, and optionally provide the remaining matches, or a subset of those remaining matches, as alternative queries. For instance, "Apple iPod™", may have the largest weight and may be selected as the reconstructed query for submission to the search engine. The results may be provided to the user along with hyperlinks that enable the user to perform searches on the alternative queries "American Idol™," and "auto insurance."

An exemplary three-word index is shown in FIG. 7. The three-word index 700 may include three sub-indexes: a third word sub-index 745, a second word sub-index 725, and a first word query index 705. Similar to the second word sub-index 625 of the two-word index 600 described above, the third word sub-indexes 745 of the three-word index 700 may include keys 750 representative of hashed values based on the third word in the full query, and values 760 representative of list of potential second words. The second word sub-index 725 may include keys 730 representative of hashed values based on the second and third words in the query, and values 740 representative of list of potential first words. Finally, the first word sub-index 705 may include keys 710 representative of hashed values based on the three word query and values 720 representative of weights associated with each query. Using the index 700 shown in FIG. 7, the system may reconstruct the query "world cup soccer" from a partial query "w c s."

Additional indexes, such as four word or five word indexes may also be created by the system in a similar fashion. Alternatively, or additionally, the system may treat the last n words of queries containing more than a specified number of words as a single word. For example, the four word query "world cup soccer schedule" may be treated by the system as a three word query with a third word "soccer schedule". Because the number of such queries is small in comparison to the one and two word queries, placing them in a single group reduces the number of indexes which need to be managed without substantially affecting the performance of the reconstruction process. Alternatively, or additionally, the system may condense queries containing more than a specified number of terms. In condensing a query, the system may remove stop words from the query. Other methods of configuring the indexes and treating multi-word queries may also be used.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method comprising:
    receiving at a server a partial query submitted at a remote user client system by a user seeking search results related to the submitted partial query, the partial query comprising one or more partial words forming an abbreviated or incomplete search query;
    storing information based on previously submitted queries received at the server;
    determining at the server a full query as the most frequently submitted, previously-submitted query received at the server that matches the partial words of the partial query; and
    at the server, submitting the full query to a search engine as a request for search results desired by the user;
    receiving, at the server, search results from the search engine that match the full query; and
    from the server, presenting the received search results to the user.

2. The computer implemented method of claim 1, further comprising
    determining an alternative query based on the partial query; and
    presenting the alternative query to the user.

3. The computer implemented method of claim 2 wherein determining an alternative query comprises identifying as alternative queries all previously-submitted queries that match the partial words of the partial query but which are not selected as the full query.

4. The computer implemented method of claim 3 where presenting the alternative query to the user comprises presenting the alternative query as a hyperlink on a web page.

5. The computer implemented method of claim 1 further comprising:
    at the server, determining a query index based on previously submitted queries received at the server; and
    comparing the partial words of the partial query with the query index to determine the full query.

6. A database search system comprising:
    a query reconstruction server to:
        receive a partial query submitted at a remote user client system;
        store a query index which is based on previously submitted queries received at the database search system;
        determine a full query based on the partial query by comparing the submitted partial query to the query index of known search queries and by determining the full query by selecting a matching known query which is the most frequently-submitted query, and
        submit the full query to a search engine; and a web server to receive from the search engine search results matching the submitted partial query and present the search results to the user client system.

7. The system database search system of claim 6 wherein the query reconstruction server further determines one or more alternative queries based on the received partial query, and wherein the web server is arranged to present the one or more alternative queries to the user client system as hyperlinks and where the selection of an alternative query hyperlink at the user client system causes the alternative query to be submitted to the search engine.

8. The database search system of claim 6 further comprising:
   a query data management server to:
      retrieve from a database historical query data relating to a plurality of previously submitted search queries;
      build the query index based on the historical query data; and
      provide the query index to the query reconstruction server.

9. The database search system of claim 6, where the query index includes weight information for the plurality of previously submitted search queries, and where the query reconstruction server determines the full query based on the weight information.

10. A method for determining a full query based on a partial query received at a database search system, the method comprising:
   receiving at a server of the database search system a partial query submitted at a remote user client system, the submitted partial query being an abbreviated or incomplete search query;
   at the server, comparing the partial query to an index of known search queries to determine matching known queries, the index being built using weighted, previously-submitted queries received at the server;
   at the server, determining a full query by selecting as the full query the matching known query with the largest weight;
   at the server, submitting the full query to a search engine as a request for search results;
   receiving, at the server, search results from the search engine that match the full query; and
   from the server, presenting the search results to the user client system.

11. The method of claim 10 further comprising:
   calculating the weights for each of the known search queries using frequency counts representative of a number of times the known search query has been submitted to the server.

12. The method of claim 11 wherein calculating the weights comprises calculating a weight for each known search query so that a greater weight is determined for a more popular query.

13. The method of claim 10 wherein determining a full query comprises:
   selecting as the full query the matching known query corresponding to the most frequently submitted, previously-submitted query, based on the frequency counts, that matches words of the partial query in matching order.

14. The method of claim 10 further comprising:
   building the index by
      retrieving information indicative of the previously submitted search queries; and
      filtering the retrieved information prior to building the index.

* * * * *